United States Patent
Toyooka et al.

[15] 3,694,623
[45] Sept. 26, 1972

[54] SURFACE HEATER FOR A TOASTER

[72] Inventors: Tadao Toyooka, Toyonaka; Hiromutsu Ueda, Ibaragi; Takeo Nishida; Atsuo Ono, both of Toyonaka, all of Japan

[73] Assignee: Matsushita Electric Industrial Co., Ltd., Osaka, Japan

[22] Filed: Sept. 3, 1970

[21] Appl. No.: 69,398

[30] Foreign Application Priority Data

Sept. 11, 1969 Japan .....................44/73051
Sept. 11, 1969 Japan .....................44/87553
Oct. 20, 1969 Japan .....................44/00008
April 20, 1970 Japan .....................45/39091

[52] U.S. Cl. ...................219/200, 219/549, 219/553
[51] Int. Cl. ...........................................H05b 1/00

[58] Field of Search......219/200, 201, 528, 529, 535, 219/538, 545, 553, 543, 549, 345; 338/208–212

[56] References Cited

UNITED STATES PATENTS

| | | | |
|---|---|---|---|
| 2,938,103 | 5/1960 | Crump | 338/208 X |
| 2,938,992 | 5/1960 | Crump | 219/528 |
| 3,257,498 | 6/1966 | Kuhn | 219/535 X |
| 2,889,439 | 6/1959 | Musgrave | 219/345 |
| 2,939,807 | 6/1960 | Needham | 219/543 X |

*Primary Examiner*—C. L. Albritton
*Attorney*—Stevens, Davis, Miller & Mosher

[57] ABSTRACT

A surface heater for a toaster is formed by sandwiching a heating element between heat-resistant insulating materials made of a glass fiber impregnated with a silicone enamel.

3 Claims, 10 Drawing Figures

PATENTED SEP 26 1972 3,694,623

T. TOYOOKA,
H. UEDA,
T. NISHIDA &
A. ONO
INVENTORS

BY *Stevens, Davis, Miller & Mosher*
ATTORNEYS

SURFACE HEATER FOR A TOASTER

This invention relates to a heater of a sandwiching-type toaster for toasting bread by means of heat of conduction. The conventional toaster which uses radiated or convected heat for toasting bread has the following disadvantages: (1) Bread is not uniformly toasted on the surface of its slice. (2) Much of the moisture inside the bread is evaporated, drying up the bread. (3) The thermal efficiency is low. (4) The toasting results are affected by the temperature and moisture of the place where the toaster is used.

The present invention is aimed at obviating the above-mentioned disadvantages by providing an improved toaster. The problem outstanding here is how to develop an excellent heater which can fulfill the following conditions while being used in close contact with the bread: (1) a high thermal resistance (The heater has to continuously withstand a temperature of 330° C) (2) free from poisonous matter (3) Bread must be easily released. (4) superior in electric characteristics (5) Bread is not warped. A satisfactory heater for sandwiching-type toaster can be obtained only after the above conditions are met.

A surface heater consisting of a cloth heating element covered with an insulating resin such as a silicone resin is well known. The silicon resin used in the conventional heater is intended for molding or laminating and therefore lacks thermal resistance to a temperature of more than 250° C. In addition, the conventional heater has not much durability against bending at high temperatures. Therefore, the conventional heater is not suitable for use at high temperatures, say, 330° C as required in the sandwiching-type toaster.

The above and other objects, features and disadvantages will be made apparent by the detailed description taken in conjunction with the accompanying drawings, in which.

Figure 1:
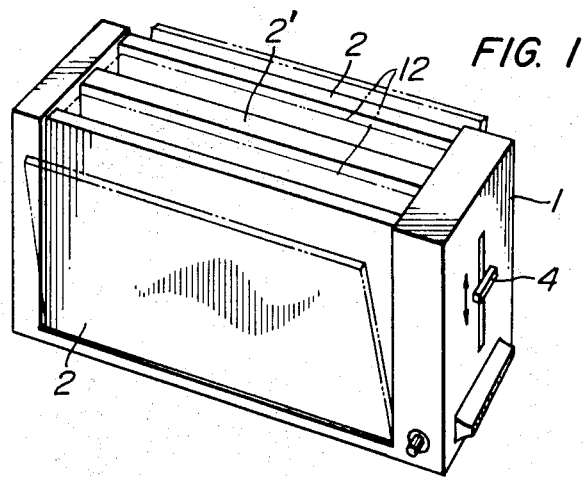
FIG. 1 shows a perspective view of a sandwiching-type toaster.
Figure 2:
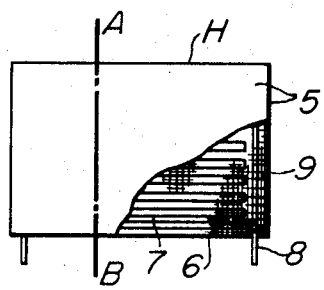
FIG. 2 is a diagram showing a partially exploded plan view of a surface heater.
Figure 3:
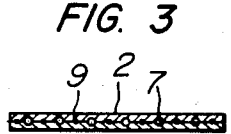
FIG. 3 shows a cross-sectional view in the plane A − B of the surface heater shown in FIG. 2.
Figure 4:
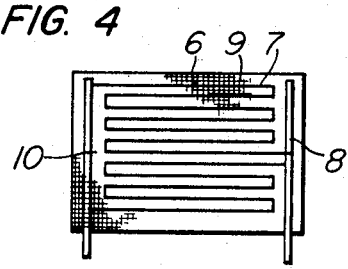
FIG. 4 is a diagram showing a plan view of the heating element.

Referring to the drawings, the reference numeral 1 in FIG. 1 shows the toaster proper, 2, 2 outer covers which turn around the center support located at a lower part of the toaster, 4 a lever which by moving up and down makes the outer covers 2, 2 turn, 2' a frame disposed at the center of the toaster proper 1 and 12 slices of bread sandwiched between the frame 2' and the outer covers 2, 2. Each of the opposing surfaces of the frame 2' and the the outer cover 2 is equipped with a heater H which toasts the bread 12. The numeral 6 shows a cloth heating element of glass fiber composed of the warp 10 and the weft 9, the heating wire 7 being woven zigzag together with the woof 9 in the center of the cloth and the lead wire 8 being interwoven with the warp 10 along both sides of the cloth as shown in FIGS. 3 and 4. This cloth heating element 6 is sandwiched and pressed under heat between the heat-resistant materials 5, 5 which consist of glass fiber dried after being impregnated with the silicone enamel used for forming an insulating film. The silicone enamel referred to above was used for forming a protective film in the prior art, but not for lamination. This silicone enamel is more stable against heat than other enamel for lamination and also has a superior flexibility against heat, and it consists of silicon, a filler such as silicon oxide and a coloring agent such as iron oxide. A catalyst is added to the above-mentioned silicone enamel to promote its hardening. The factors to be taken into consideration in adding a catalyst are: (1) How the heating wire is affected by the catalyst. (2) The glass fiber which is impregnated with the silicone enamel and semi-hardened, called a prepreg, is further hardened normal temperature. Hence the prepreg cannot be maintained in this state for a long time, its maximum pot life being about seven days. The present invention includes improvements on these points, too. A metallic salt of an organic acid is generally used as a catalyst and a laboratory test by the inventor shows that when stainless steel, nickel or nichrome is used as the heating wire 1 Zn, Fe or Cu salt of an organic acid produced relatively satisfactory results. Especially, it was found that a salt of octylic acid shows the least variation in resistance.

Figure 5:
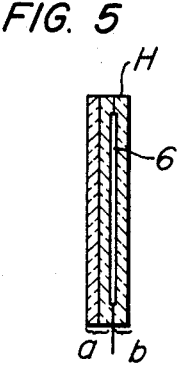
FIG. 5 shows a cross-sectional view of another embodiment of the surface heater.
Figure 6:
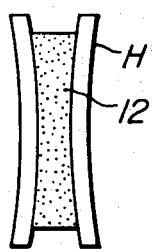
FIG. 6 illustrates a cross-sectional view of the surface heater shown in FIG. 5 with a slice of bread being toasted.
Figure 7:
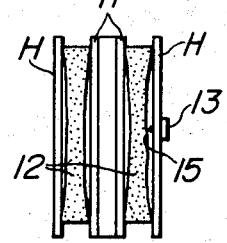
FIGS. 7 and 8 show a cross-sectional view of a bad and a good combination respectively of surface heater and temperature detecting element.
Figure 9:
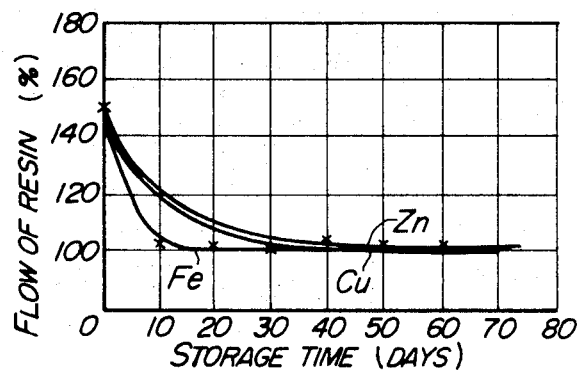
FIG. 9 shows characteristics of resin flow in a prepreg depending on different kinds of catalysts.
Figure 10:
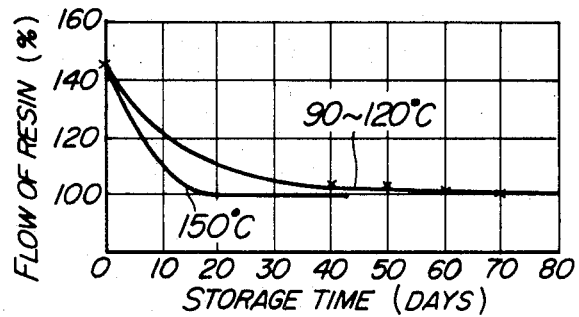
FIG. 10 is a diagram showing the characteristics of resin flow in a prepreg with respect to the drying time.

In making a prepreg, the silicone enamel to which a catalyst is added is covered over a glass fiber and dried to disperse the solvent. Then it is stored in this state until laminated. The pot life of the prepreg depends on the amount of the catalyst added and the condition under which the prepreg is dried. To give more detail, the prepreg, due to the catalyst added to it, goes on hardening even if left at normal temperature. Therefore, the storage period of the prepreg has much bearing on not only the temperature at and the period for which the prepreg is dried but also on the type and amount of the catalyst added. According to the inventor's experiment, the pot life was about 20 days when the drying temperature is 150° C as shown in FIG. 10 while it lasted as long as 60 days when the glass fiber is dried at the temperature of 90° to 120° C. The catalysts to be employed include Zn, Cu and Fe, among which it was found that Zn maintains the longest pot life of the prepreg. That is to say, as may be clear from FIG. 9, the longer the time required for resin flow or hardening, the longer the pot life that can be obtained. The optimum amount of the catalyst to be added is from 1 to 5 weight percent. Addition of catalyst over this amount is not desirable as it shortens the pot life of the prepreg. The catalyst is not necessarily needed, but without it the hardening occurs at a higher temperature, resulting in a longer time needed for hardening. On the other hand, the percentage of the solid silicone enamel, namely, the viscosity should be neither too high nor too low. The inventor's experiment shows that it should fall within the range from 150 to 300 cps or preferably 200 cps, the corresponding percentage of the solid enamel component being about 42 percent. The percentage ranges from 38 to 50 when the viscosity is from 150 to 300 cps. As can be seen from the above description, the silicone enamel of 150 to 300 cps in viscosity to which 0 to 5 weight percent of the catalyst Zn is added is applied to a glass fiber and dried for 5 to 30 minutes at the temperature of 90° to 120° C, thereby to obtain the prepreg 5. Next, molding of the heater will be described. The cloth heating element 6 is sandwiched between a couple of prepregs 5 and heat-pressed for a period of more than 1 minute at a temperature of 250° to 330° C under a pressure of 30 to 40 kg/cm², and is thereafter cooled and cured for 5 to 10 hrs at a temperature of 250° to 330° C. By using a high temperature heater completed as above, bread can be toasted uniformly over the whole surface thereof, with its center deliciously containing much moisture. The disadvantage of the above-mentioned heater is that the edge of the bread slice tends to be toasted too early compared with its center portion. To overcome this disadvantage, it is desirable to construct the heater in the following way: With reference to FIGS. 5, 6 and 7, the heater H is constructed in a convex shape with its center nearer the bread 12. If, as shown in FIG. 7, the concave bread 12 is toasted by the flat plates of the heater H, the edge of the bread is liable to be toasted too easily as mentioned above. This difficulty can be overcome by raising the center of the heater H toward the bread in a convex curve as shown in FIG. 6. In greater detail, the insulating material $a$ is made thicker than the insulating material $b$ which is disposed beyond the in-between heating element 6 as shown in FIG. 5, whereby the heater, when heated, is warped, forming a convex curve with its center portion nearer the bread being toasted. Thus the whole surface of the bread 12 is uniformly toasted. This device can also successfully deal with a considerably warped slice of bread, in which case the heater H comes into close contact with the whole surface of the bread due to the flexibility of the heater to brown the whole surface of the bread uniformly. It is needless to say that, instead of the heater employed in the above-mentioned embodiment which convexes during the heating operation, a heater which is formed in a convex or other shape similar to that of the bread in advance may be used to obtain the same effect.

Figure 8:
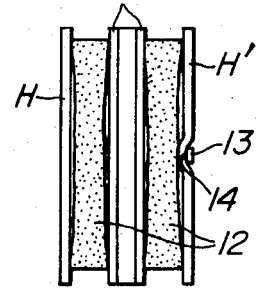

Now the temperature detector element is described below. In a heater of the type mentioned above, the color of toast maintains a certain relationship with the temperature of the heater. It is therefore easy to adjust the color of toast by controlling the surface temperature of the heater. A variety of detector elements are available to achieve this purpose. FIG. 7 shows a detector element mounted on the back of a flat heater H. In this construction, if a space 15 develops between the bread 12 and the heater H, the air existing in that portion causes the temperature of that portion of the heater to rise quicker than the rest of the heater where it is in close contact with the bread. As a result, the control mechanism is actuated too early, making it impossible to obtain brown toast. FIG. 8 illustrates a means to obviate this disadvantage. The heater is provided with a projection 14 on the surface thereof which enables the detector element 13 to be always in contact with the bread even if the bread is considerably deformed, with the result that the detector element 13 behind the projection 14 faithfully detects the temperature to obtain the best color of toast. Beside the advantage of the uniformity of toast color obtained by this simple construction, the projection can be used as a registration for positioning the heater when molding it, contributing to the shortening of the molding time.

It may be understood from the above description that the heater with a cloth surface heating element sandwiched by heat-resistant materials of silicone enamel-containing glass fiber can resist the temperature of from 300° to 350° C and has ideal characteristics for a sandwiching-type toaster, including easy molding, high ruggedness and the superior releasability from bread over the conventional sandwiching-type toaster.

What is claimed is:

1. A surface heater used for a bread toaster which operates at a temperature higher than 300° C comprising a woven sheet containing heating wires, and a plurality of sheets made of glass fiber and impregnated with silicone enamel, the former sheet containing heating wires being sandwiched between the latter sheets of glass fiber.

2. A surface heater according to claim 1, at least one surface of which is slightly bulging.

3. A surface heater according to claim 1, which has a protrusion on one side thereof and a complementary recess on the opposite side in the center part thereof, said recess being adapted to receive a temperature detecting element therein.

* * * * *